(12) United States Patent
Sengelin

(10) Patent No.: US 6,354,090 B1
(45) Date of Patent: Mar. 12, 2002

(54) TRANSFER LINE FOR CRYOGENIC FLUID AND ITS USE FOR THE TRANSFER OF LIQUID HELIUM

(75) Inventor: Jean-Paul Sengelin, Saint Etienne De Cross (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/480,015

(22) Filed: Jan. 10, 2000

(30) Foreign Application Priority Data

Jan. 12, 1999 (FR) .............................. 99 00221

(51) Int. Cl.⁷ .............................................. F17C 13/00
(52) U.S. Cl. .................................................... 62/50.7
(58) Field of Search ............................................ 62/50.7

(56) References Cited

U.S. PATENT DOCUMENTS 3,130,555 A * 4/1964 Haettinger ..................... 62/55
3,762,447 A   10/1973 Holland
3,904,394 A * 9/1975 Prast et al. ..................... 62/55
4,233,816 A * 11/1980 Hensley .......................... 62/55
5,307,639 A * 5/1994 Boissin .......................... 62/50
6,012,292 A * 1/2000 Gulati et al. .................. 62/50.7

FOREIGN PATENT DOCUMENTS

EP          0 437 377          7/1991

* cited by examiner

Primary Examiner—William Doerrler
Assistant Examiner—Malik N. Drake
(74) Attorney, Agent, or Firm—Young & Thompson

(57) ABSTRACT

Each spacing member (3) between the internal tube (2) for the transfer of fluid and the external envelope (1) have a contact zone (30) at least with the envelope (1) having an angular extent less than 90°, the contact zones with the envelope (30) and with the tube (31) being angularly offset. The spacing member (3) is made of a non-metallic material with low thermal conductivity and is coated, at least on its axial surfaces, with a layer of reflecting product, typically a metallic deposit.

Use in the transfer of super-cold fluids, in particular liquid helium.

10 Claims, 1 Drawing Sheet

TRANSFER LINE FOR CRYOGENIC FLUID AND ITS USE FOR THE TRANSFER OF LIQUID HELIUM

The present invention relates to transfer lines for cryogenic fluids, of the type comprising, in an external tubular envelope, at least one internal tube for the transfer of fluid and at least one spacing member extending transversely between the tube and the envelope.

In the presently known techniques, the spacing members are generally of unpolished stainless steel and over-dimensioned to limit thermal loss by conduction.

The present invention has for its object to provide a fluid transfer line, and more particularly improved structures of spacing members permitting in a simple way and without significant increase of cost, reducing considerably the thermal losses.

To do this, according to one aspect of the invention, the spacing member has a polished external surface, typically by application of a layer of reflecting product.

According to other aspects of the invention:
 the contact zones of the spacing member with the internal tube and the external envelope have an angular extent less than 90°, typically less than 60°, the contact zones with the tube on the one hand and with the envelope on the other hand being preferably angularly offset,
 a portion of intermediate tube of material of low thermal conductivity is interposed between the spacing member and the internal tube, preferably with the interposition of a layer of insulating material between the portion of the intermediate tube and the internal tube.

The present invention also has for its object the use of such a cryogenic transfer line for the transfer of liquid helium.

Other characteristics and advantages of the present invention will become apparent from the following description of embodiments, given by way of illustration but in no way limiting, with respect to the accompanying drawing, in which.

In the description that follows and in the drawing, identical or analogous elements have the same reference numerals.

Figure 1:
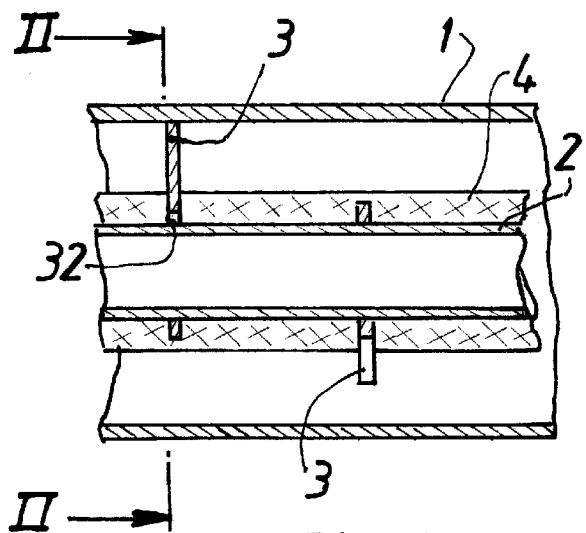
FIG. 1 is a fragmentary longitudinal cross-sectional view of a first embodiment of the invention.

In FIG. 1 are seen the principal elements of a simple cryogenic fluid transfer line, namely an external sealed envelope 1 through which extends a cryogenic transfer tube 2 maintained in position, in this case concentrically, within the envelope 1, by means of spacing members 3 disposed at substantially regular intervals along the tube 2 and angularly offset relative to each other with respect to the axis of these latter. Conventionally, the tube 2 is surrounded or clad with a sleeve 4 of super-insulation, produced for example by winding, such as that sold under the trademark NH12ST by the Cascadec Company.

Figure 2:
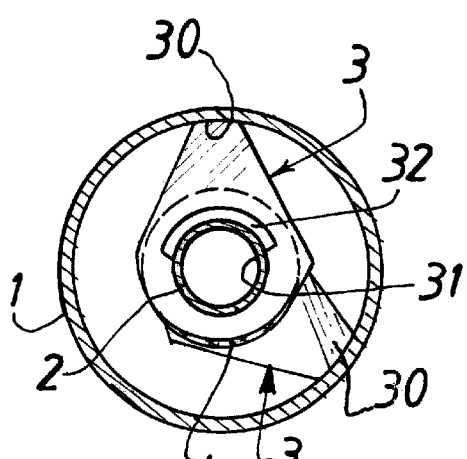
FIG. 2 is a transverse cross-sectional view on the line II—II of FIG. 1.

In the embodiment of FIGS. 1 and 2, the spacing member 3 extends radially on a single side of the tube 2. According to the invention, it bears externally against the internal surface of the external tube 1 with an end zone 30 of small angular extent, less than 30° in the illustrated example. The tube 2 is for its part inserted in a bore 31 of the spacing member 3 of which a portion is enlarged by an angular opening 32 located facing the distal contact region 30 and of an angular extent greater than this latter, such that there cannot be established a direct thermal bridge between the internal tube 2 and the envelope 1 in line with the contact zone 30.

Figure 3:
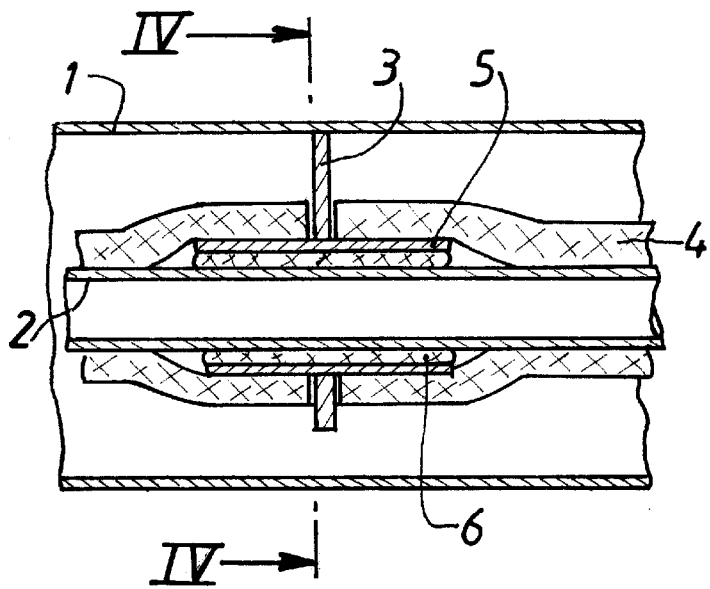
FIG. 3 is a fragmentary longitudinal cross-sectional view of another embodiment of the invention.
Figure 4:
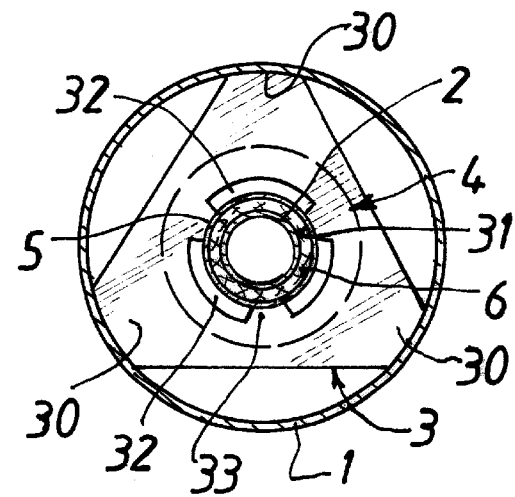
FIG. 4 is a transverse cross-sectional view on the line IV—IV of FIG. 3.

In the embodiment of FIGS. 3 and 4, the spacing member 3 has a generally triangular shape with three external zones 30 bearing against the envelope 1, each of a small angular extent, less than 30°. Correspondingly, the internal bore 31 is reduced, here to three fingers 33, of an angular extent less than 30°, separated by three openings 32 each located facing a distal bearing zone 30.

Moreover, in this embodiment of FIGS. 3 and 4, the spacing member 3 does not directly support the internal tube 2: an intermediate structure coaxial with at least a portion of the intermediate tube 5 and of a tubular layer 6 of insulating or super-insulating material is interposed between the fingers 33 of the spacing member 3 and the internal tube 2. The layer 6 is preferably wound about the tube 2 and the portions of tube 5 are maintained about the layer 6 by the fingers 33. In this embodiment, the heat insulating sleeve 4 of the internal tube 2 extends about the intermediate structure by surrounding the intermediate tube 5, as is seen in FIG. 3.

According to one aspect of the invention, the spacing members 3 are made of a non-metallic material with a low thermal conductivity, typically of glass fiber impregnated with epoxy resin, and their external surfaces, in this case at least the opposite axial surfaces, have been subjected to a suitable surface treatment so as to avoid the "black body" phenomenon, typically by emplating or depositing a metallic coating of very thin thickness, preferably of aluminum.

According to another aspect of the invention, the intermediate tube 5 is itself also of a material of low heat conductivity, for example of stainless steel or an iron/nickel alloy, or else of glass fiber impregnated with epoxy. The internal insulating muffle 6 is typically made of the same super-insulation as the sleeve 4.

The external envelope 1 is typically of stainless steel. The internal tube 2 is also of stainless steel or an iron/nickel alloy of the Invar type. The space within the envelope 1 is maintained under vacuum.

The arrangement of the transfer line according to the invention is suitable most particularly for the transfer of cryogenic fluids at very low temperature, in particular for the transfer of liquid helium particularly toward installations for confining the plasmas of superconductive magnets.

Although the present invention has been described in relation to particular embodiments, it is not thereby limited but on the contrary is adaptable to modifications and variations which will become apparent to those skilled in the art. In particular, it also relates to transfer lines for the bundle of parallel internal tubes each held within the envelope 1 by unilateral spacing members such as those described in relation to FIGS. 1 and 2.

What is claimed is:

1. Transfer line for cryogenic fluid comprising, in an external tubular envelope, at least one internal tube for the transfer of fluids and at least one spacing member extending transversely between the internal tube and the envelope, wherein the spacing member has an external polished surface.

2. Line according to claim 1, wherein at least one of the axial surfaces of the spacing member is covered with a layer of reflecting product.

3. Line according to claim 1, wherein the contact zones of the spacing member with at least the external envelope have an angular extent less than 90°, preferably less than 60°.

4. Line according to claim 3, wherein the contact zones of the spacing member with the internal tube and the envelope are angularly offset.

5. Line according to claim 1, wherein at least one portion of an intermediate tube is of a material of low thermal conductivity and is disposed between the spacing member and the internal tube.

6. Line according to claim 5, which further comprises at least one layer of insulating material between the intermediate tube portion and the internal tube.

7. Line according to claim 1, wherein the pacing number is of a non-metallic material with low thermal conductivity.

8. Line according to claim 1, wherein the internal tube is surrounded by a sleeve of insulating material.

9. Line according to claim 5, wherein the internal tube is surrounded by a sleeve of insulating material, and wherein the sleeve also surrounds the intermediate tube portion.

10. The use of a transfer line according to claim 2 for the transfer of liquid helium.

* * * * *